(12) United States Patent
Nakagawa et al.

(10) Patent No.: US 10,394,203 B2
(45) Date of Patent: Aug. 27, 2019

(54) CONTROL DEVICE, CONTROL METHOD, AND PROGRAM PERFORMING A TABULATION OPERATION AT HIGH SPEED

(71) Applicant: Mitsubishi Electric Corporation, Tokyo (JP)

(72) Inventors: Koichi Nakagawa, Tokyo (JP); Hiroshi Ashiya, Tokyo (JP); Hiroyuki Makita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 15/526,604

(22) PCT Filed: Nov. 19, 2014

(86) PCT No.: PCT/JP2014/005820
§ 371 (c)(1),
(2) Date: May 12, 2017

(87) PCT Pub. No.: WO2016/079771
PCT Pub. Date: May 26, 2016

(65) Prior Publication Data
US 2017/0336766 A1   Nov. 23, 2017

(51) Int. Cl.
*G06F 9/46* (2006.01)
*G05B 15/02* (2006.01)
*G05B 19/05* (2006.01)

(52) U.S. Cl.
CPC ........... *G05B 15/02* (2013.01); *G05B 19/056* (2013.01)

(58) Field of Classification Search
None
See application file for complete search history.

(56) References Cited

U.S. PATENT DOCUMENTS

| 5,577,180 A * | 11/1996 | Reed ............... A63F 13/10 345/634 |
|---|---|---|
| 2012/0239172 A1 | 9/2012 | Nishiyama et al. |
| 2014/0207254 A1 | 7/2014 | Nishiyama et al. |

FOREIGN PATENT DOCUMENTS

| DE | 10 2010 063 773 A1 | 10/2018 |
|---|---|---|
| JP | 59-053906 A | 3/1984 |

(Continued)

OTHER PUBLICATIONS

Notification of Reason for Refusal for Japanese Patent Application No. 2016-559695, dated Mar. 14, 2017.

(Continued)

*Primary Examiner* — Wissam Rashid
(74) *Attorney, Agent, or Firm* — Sughrue Mion, PLLC; Richard C. Turner

(57) ABSTRACT

A PLC, which is a control device includes a device memory that stores data acquired by an external sensor, a data extracting unit that periodically extracts data of predetermined types among the data stored in the device memory, a data distributing unit that stores the data extracted by the data extracting unit in an operation buffer corresponding to the data among a plurality of operation buffers provided according to the predetermined types, and a data tabulating unit that performs, when the operation buffer stores data equivalent to a predetermined period, arithmetic processing of the data stored in the operation buffer.

39 Claims, 8 Drawing Sheets

(56) References Cited

FOREIGN PATENT DOCUMENTS

| JP | 6-259114 | A  | 9/1994  |
|----|----------|----|---------|
| JP | 8-009766 | Y2 | 3/1996  |
| JP | 8-305421 | A  | 11/1996 |
| JP | 9-244618 | A  | 9/1997  |
| JP | 2004-133581 | A | 4/2004 |
| JP | 2006-243936 | A | 9/2006 |
| JP | 2013-025353 | A | 2/2013 |
| JP | 2014-182726 | A | 9/2014 |
| WO | 2013/048405 | A1 | 4/2013 |

OTHER PUBLICATIONS

International Search Report of PCT/JP2014/005820, dated Feb. 24, 2015. [PCT/ISA/210].

Communication dated Oct. 4, 2018 from the German Patent and Trademark Office in counterpart Application No. 11 2014 007 188.9.

* cited by examiner

FIG.3

```
01: #include<stdio.h>
02:
03: #define MAX 10
04: #define BIAS 2
05: #define SIZE 8
06:
07: //**********PLUG-IN STARTS HERE*************
08: //
09: //SET I/F (FUNCTION NAME, ARGUMENT LIST) IN PLUG-IN ALWAYS THE SAME
10:
11: //EXTRACTION FUNCTION
12: bool IsOdd(int n)
13: {
14:    return(n%2=0? true:false);
15: }
16: //OPERATION ALGORITHM
17: void algorithum(int* pBuffer ,int length)
18: {
19:    for(int i=0;i<length;i++){
20:       pBuffer[i]=(pBuffer[i]+BIAS)/MAX*100.0;
21:    }
22: }
23: //TABULATION FUNCTION
24: int aggregation(int* pBuffer,int length)
25: {
26:    int result=0;
27:    for(int i=0;i<length;i++){
28:       result=result+pBuffer[i];
29:    }
30:    return result/length;
31: }
32:
33: //**********PLUG-IN ENDS HERE*************
34:
35: //HOST STARTS HERE
36:
37: void main()
38: {
39:    int IntArray[SIZE]={1,2,3,4,4,5,6,7};
40:     int DateArray[SIZE]={
41:
42:    int length=find_if(IntArray,IntArray+8,IsOdd);
43:    //ope_buffer={2,4,4,6}
44:
45:    algorithum(ope_buffer,length);
46:    //ope_buffer={40%,60%,60%,80%}
47:
48:    int average=aggregation(ope_buffer,length);
49:    //AVERAGE IS 45%
50: }
```

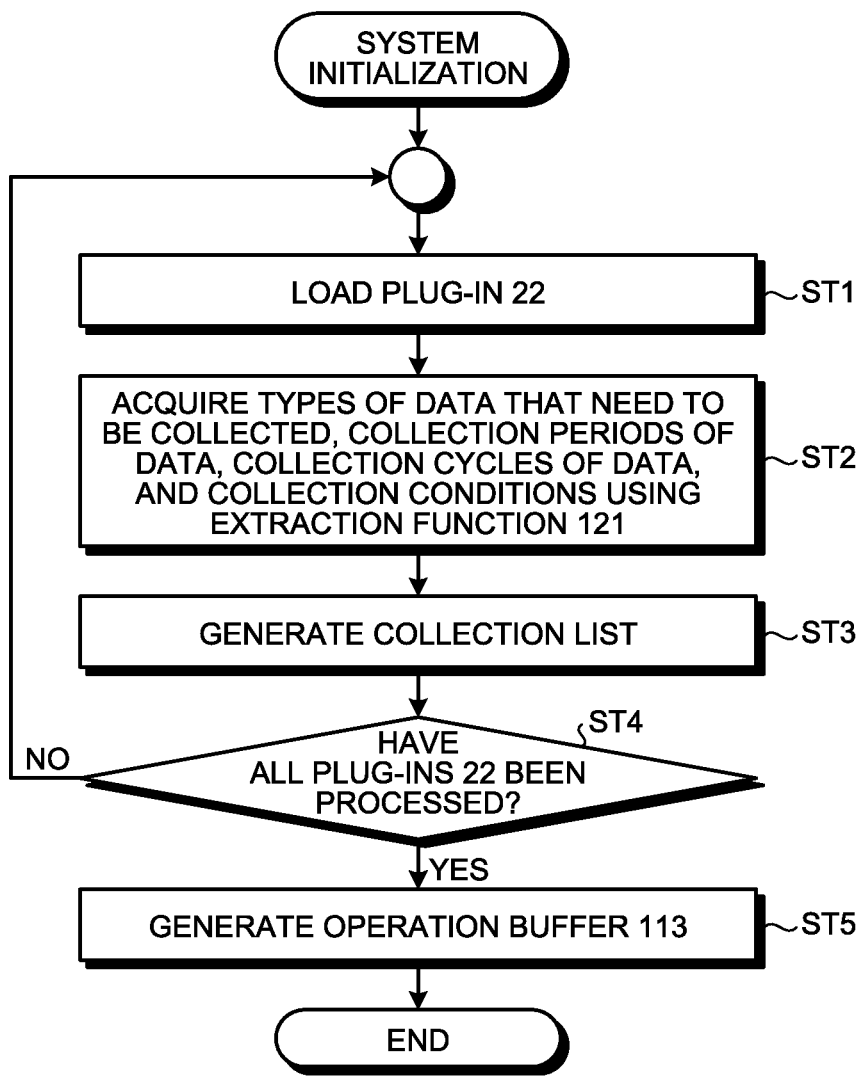

FIG.5

```
01: /*
02: * EXTRACTION FUNCTIONS  DEFINE FOR EACH OF USERS
03: */
04: bool test_function_per_day(time_t* start,time_t* end,int* address,int* period)
05: {
06:           *start=StringToTime("00:00:00");
07:           *end=StringToTime("00:00:59");
08:           *address=0x1234;
09:           *period=1000
10: }
11:
12: //INVOKED FROM CONTROL DEVICE EVERY TIME DATA IS ACQUIRED.
13: //THIS FUNCTION IS INVOKED EVERY TIME DATA OF ADDRESS SUBJECTED
14: //TO RegisterDataAcquisitionBY MAIN FUNCTION IS READ.
15: void OnDataChange(int address,Value value,TimeStamp timestamp)
16: {
17:           OperationBuffer*pBuffer=NULL;
18:
19:           //ACQUIRE BUFFER LINKED TO ADDRESS
20:           //PROVIDE FUNCTION FindOperationBuffer FOR SEARCHING FOR RELATED OPERATION
21:           //BUFFER FROM ADDRESS INSTEAD OF if SENTENCE AND DIVIDE FUNCTION
22:           pBuffer=FindOperationBuffer(address);
23:           //VALUE IS ADDED
24:           pBuffer->AddValue(value,timestamp);
25: }
26:
27: //MAIN FUNCTION
28: main()
29: {
30:           ...
31:
32:           //
33:           //CREATE OPERATION BUFFER
34:           //
35:           time_t start;
36:           time_t end;
37:           int address;
38:           int_period;
39:
40:           OperationBuffer*pBuffer=NULL; //OPERATION BUFFER
41:
42:           //ACQUIRE INFORMATION FOR IDENTIFYING BUFFER FROM EXTRACTION FUNCTION
43:           //*WHEN THERE ARE PLURALITY OF EXTRACTION FUNCTIONS, INVOKE ALL CASES
44:           test_fuction_per_day(&start,&end,&address,&period);
45:
46:           //CREATE BUFFER ONLY WHEN THERE IS NO BUFFER ALREADY
47:           if(IsOperationBufferExisted(start,end,address,period);
48:                       in buffer_size=CaliculateBufferSize(start,end,period);
49:                       pBuffer=new OperationBuffer(start,end,period,buffer_size);
50:                       //REGISTER BUFFER TOGETHER WITH ADDRESS
51:                       AddOperationBuffer(address,pBuffer);
52:                       //REGISTER DESIGNATED ADDRESS TO PERFORM DATA COLLECTION AT
                          DESIGNATED CYCLE
53:                       RegisterDataAquition(address,period);
54:           }
55:
56:           //
57:
58: }
```

FIG.6

| SIGNAL ID | TYPE OF DATA | AD-DRESS | CYCLE [ms] | START TIME | END TIME |
|---|---|---|---|---|---|
| 001/KL002 | TEMPERATURE OF TEMPERATURE SENSOR "a" | X1234 | 1000 | 2014/4/29:00:00:00 | 2014/4/29:00:00:59 |
| 001/KL003 | FLOW RATE OF FLOW METER A | X2011 | 10 | 2014/4/29:00:00:00 | 2014/4/29:00:00:59 |
| 001/KL004 | TEMPERATURE OF TEMPERATURE SENSOR "b" | X1235 | 1000 | 2014/4/29:00:00:00 | 2014/4/29:00:00:14 |
| 001/KL005 | PRESSURE OF PRESSURE GAUGE B | X2022 | 500 | 2014/4/29:00:00:00 | 2014/4/29:00:00:15 |
| 001/KL006 | FLOW RATE OF FLOW METER A | X2011 | 20 | 2014/4/29:00:00:00 | 2014/4/29:00:00:59 |
| 001/KL007 | TEMPERATURE OF TEMPERATURE SENSOR "a" | X1234 | 1500 | 2014/4/29:00:00:00 | 2014/4/29:00:59:59 |
| 001/KL008 | TEMPERATURE OF TEMPERATURE SENSOR "a" | X1234 | 60000 | 2014/4/29:00:00:00 | 2014/4/29:00:59:00 |
| ⋮ | | | | | |

FIG.7

| No. | SIGNAL NAME | AD-DRESS | DATA TYPE | START TIME | END TIME | CYCLE [ms] |
|---|---|---|---|---|---|---|
| 1 | TEMPERATURE SENSOR "a" | X1234 | WORD | 2014/4/29:00:00:00 | 2014/4/29:00:00:59 | 1000 |
| 2 | FLOW METER A | X2011 | DWORD | 2014/4/29:00:00:00 | 2014/4/29:00:00:59 | 10 |
| 3 | TEMPERATURE SENSOR "b" | X1235 | WORD | 2014/4/29:00:00:00 | 2014/4/29:00:00:14 | 1000 |
| 4 | PRESSURE GAUGE B | X2022 | DWORD | 2014/4/29:00:00:00 | 2014/4/29:00:00:15 | 500 |
| 5 | TEMPERATURE SENSOR "a" | X1234 | WORD | 2014/4/29:00:00:00 | 2014/4/29:00:59:59 | 1500 |
| ⋮ | | | | | | |

FIG.8

| [00] | [01] | [02] | [03] | [04] | | | | | [59] |
|---|---|---|---|---|---|---|---|---|---|
| 100 | 200 | 300 | 400 | 500 | | | | | 6000 |

(a)

| [00] | [01] | [02] | [03] | [04] | | | | | [59] |
|---|---|---|---|---|---|---|---|---|---|
| 10.15 | 10.30 | 10.45 | 11.0 | 11.15 | | | | | 19.00 |

(b)

| MAXIMUM | MINIMUM | AVERAGE | TOTAL | kpl_1 | kpl_2 | | |
|---|---|---|---|---|---|---|---|
| 19.00 | 10.15 | 14.58 | 843.60 | | | | |

(c)

```
01: float max(float value_array[],size_t length)
02: {
03:         floatfloat max=value_array[0];
04:         for(int i=1;i<length;i++){
05:                 if(max<value_array[i]){
06:                         max=value[i];
07:                 }
08:         }
09:         return max;
10: }
```

```
01: float total_sum(float value_array[],size_t length)
02: {
03:         float sum=value_array[0];
04:         for(int i=1;i<length;i++){
05:                 sum +=value_array[i];
06:         }
07:         return sum;
08: }
```

CONTROL DEVICE, CONTROL METHOD, AND PROGRAM PERFORMING A TABULATION OPERATION AT HIGH SPEED

CROSS REFERENCE TO RELATED APPLICATIONS

This application is a National Stage of International Application No. PCT/JP2014/005820 filed Nov. 19, 2014, the contents of all of which are incorporated herein by reference in their entirety.

FIELD

The present invention relates to a control device, a control method, and a program installed in a memory of the control device for acquiring data from the outside, computing the acquired data, and outputting a signal for controlling an apparatus.

BACKGROUND

Among conventional control devices, a PLC (Programmable Logic Controller) is a programmable control device. The PLC acquires high-speed/large-capacity data from an external sensor, computes the data according to a sequence control program described in a ladder language or the like, and outputs a signal for controlling an external apparatus.

In recent years, in a monitoring control system that links a control device such as a PLC with host information system software such as an MES (Manufacturing Execution System) or an ERP (Enterprise Resource Planning) or treats high-speed/large-capacity process data by dedicated software called SCADA (Supervisory Control And Data Acquisition), for example, the control device is connected to an apparatus such as a sensor or an actuator in a plant, the apparatus is controlled by the control device, the SCADA reads measurement data of the apparatus stored in a memory of the control device, monitors the plant on a real-time basis, store data in time series, and graphically displays collected data on an HMI (Human Machine Interface).

A conventional control device is explained. The conventional control device uses a model for executing specific processing when a certain event occurs, defines a condition corresponding to the event occurrence as a start condition, and defines processing executed by the event occurrence as an action. The start condition and the action related to the start condition are managed in units of a job. The conventional control device defines, in job information, start conditions, all actions executed according to the start condition, and start patterns of the actions and, when a certain start condition holds, executes the actions according to a start pattern defined in the job information corresponding to the start condition (see, for example, Patent Literature 1).

CITATION LIST

Patent Literature

Patent Literature 1: Japanese Patent Application Laid-Open No. 2006-243936 (paragraphs 0002 and 0024 and FIG. 1 and FIG. 11)

SUMMARY

Technical Problem

When the conventional control device is used in a system lined with host information system software, to execute a so-called tabulation operation for collectively performing processing concerning a plurality of data arranged in time series to calculate a maximum, a minimum, a total, and the like of collected data, it is necessary to set actions having the same content by length of a collection period of data. For example, when data is extracted from a memory of the control device at every one second, if the collection period is set to one hour, setting of 3600 actions is necessary. Therefore, setting work takes time. Because the number of times of invocation of actions increases as the collection time increases, there is a problem in that the control device has to execute processing having an enormous computation amount and cannot perform the tabulation operation at high speed.

The present invention has been devised in view of the above and an object of the present invention is to obtain a control device, a control method, and a program installed in a memory of the control device that can perform a tabulation operation at high speed.

Solution to Problem

A control device according to the present invention includes a device memory that stores data acquired by an external sensor, a data extracting unit that periodically extracts data of predetermined types among the data stored in the device memory, a data distributing unit that stores the data extracted by the data extracting unit in an operation buffer corresponding to the data among a plurality of operation buffers provided according to the predetermined types, and a data tabulating unit that performs, when the operation buffer stores data equivalent to a predetermined period, arithmetic processing of the data stored in the operation buffer.

A control method according to the present invention includes a data storing step for storing data acquired by an external sensor in a memory, a data extracting step for periodically extracting data of predetermined types among the data stored in the data storing step, a data distributing step for storing the data extracted in the data extracting step in a buffer corresponding to the data among a plurality of buffers provided according to the predetermined types, and a data tabulating step for performing, when the buffer stores data equivalent to a predetermined period, arithmetic processing of the data stored in the buffer.

Concerning a program installed in a memory in a control device including the memory to store the program and a processor to execute the program, the control device performing arithmetic processing for each of data equivalent to a predetermined period among data acquired by an external sensor, the program according to the present invention causes the processor of the control device to execute a data extracting step for periodically extracting data of predetermined types among the data acquired by the external sensor and stored in the memory, a data distributing step for storing the data extracted in the data extracting step in a buffer corresponding to the data among a plurality of buffers provided according to the predetermined types, and a data tabulating step for performing, when the buffer stores data equivalent to a predetermined period, arithmetic processing of the data stored in the buffer.

Advantageous Effects of Invention

According to the present invention, it is possible to provide a control device, a control method, and a program installed in a memory of the control device that can perform a tabulation operation at high speed.

BRIEF DESCRIPTION OF DRAWINGS

FIG. 3 is a diagram showing an example of a host and a plug-in in the first embodiment.

FIG. 4 is a flowchart showing an operation procedure of a PLC at the time when the information link system starts and performs initialization in the first embodiment.

FIG. 5 is a diagram showing an example of a host and a plug-in at the time when measurement data of a temperature sensor is collected in the first embodiment.

FIG. 6 is a diagram showing an example of data extracted by a data extracting unit in the first embodiment.

FIG. 7 is a diagram showing an example of a collection list in the first embodiment.

FIG. 8 is a diagram showing an example of an operation buffer in the first embodiment.

DESCRIPTION OF EMBODIMENTS

First Embodiment

Figure 1:
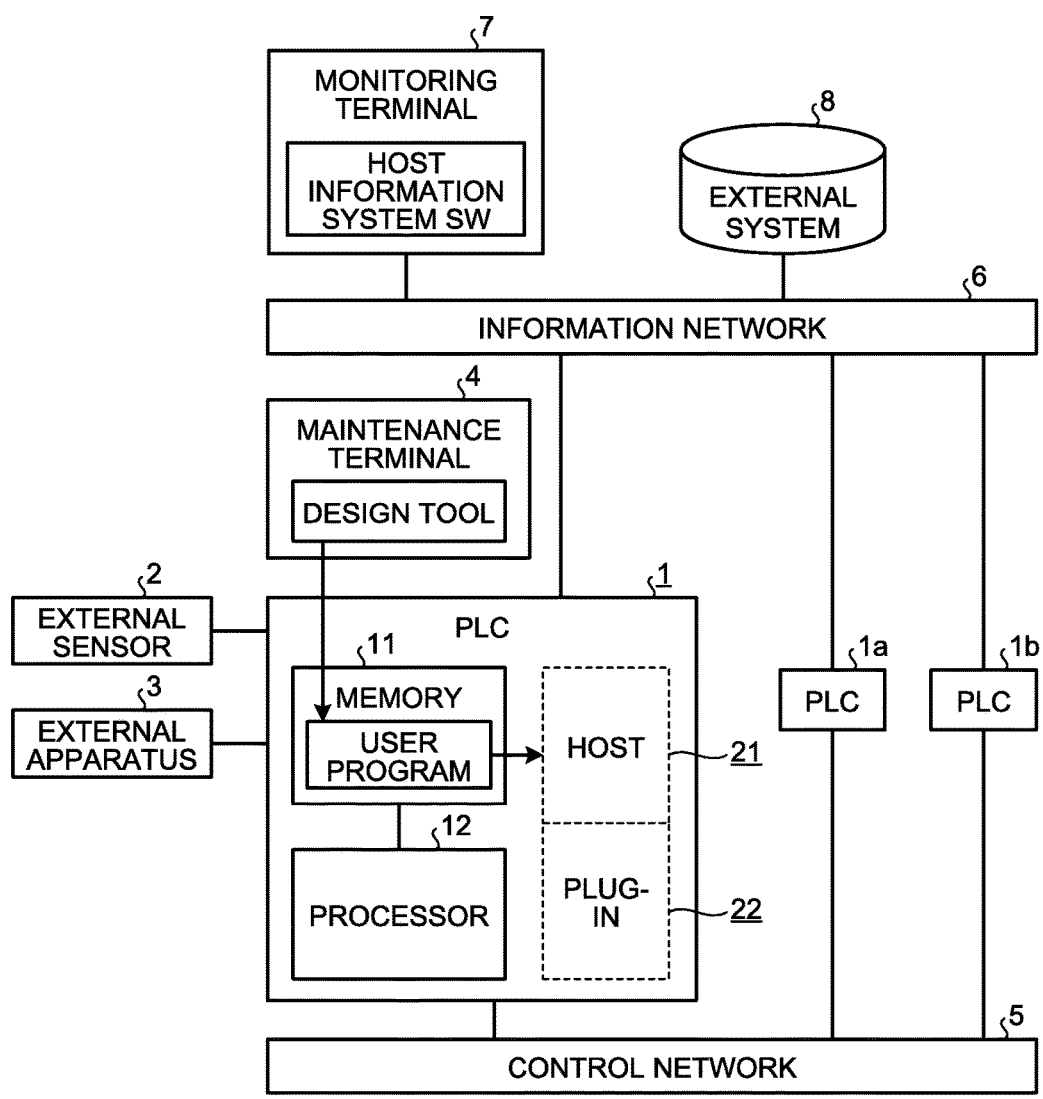
FIG. 1 is a schematic diagram showing a schematic configuration of an information link system in a first embodiment.

FIG. 1 is a schematic diagram showing a schematic configuration of an information link system in a first embodiment. The information link system including a control device in the first embodiment is explained with reference to FIG. 1. Note that, in the following explanation, the information link system including the control device is explained. However, a monitoring control system including the control device can be realized in the same manner. The present invention is not limited by the first embodiment.

In the information link system in the first embodiment, a PLC 1 is used as the control device. As shown in FIG. 1, an external sensor 2 and an external apparatus 3 are connected to the PLC 1. The external sensor 2 is, for example, a temperature sensor, a flow meter, or a pressure gauge. The external apparatus 3 is, for example, a pump or a valve. A plurality of the apparatuses are connected to the PLC 1 as the external sensor 2 or the external apparatus 3.

The PLC 1 includes a memory 11 and a processor 12 as hardware components. The memory 11 is a memory such as a RAM or a flash memory. The processor 12 is a central processing unit (CPU) that controls the operation of the entire PLC 1.

The PLC 1 loads a user program from a design tool included in a maintenance terminal 4 to the memory 11. The processor 12 executes the user program stored in the memory 11, whereby the PLC 1 reads measurement data from the external sensor 2 and outputs a control signal to the external apparatus 3 to control the external apparatus 3. As explained in detail below, a host 21 and a plug-in 22 in the PLC 1 mean software processing realized by the execution of the user program.

In the first embodiment, the PLC 1 is connected to other PLCs 1a and 1b by a control network 5. The control network 5 is not limited to the example shown in FIG. 1 and can connect any number of PLCs. In the example shown in FIG. 1, a plurality of PLCs can exchange data with one another on a real-time basis using, for example, a system called a shared memory (referred to as cyclic memory as well) that cyclically communicates data stored in the memory to synchronize the data.

An information network 6 connects the PLC 1 and a monitoring terminal 7. The information network 6 is a medium such as a local area network (LAN). The PLC 1 is connected to the information network 6 using a communication port separate from a communication port of the control network 5.

The monitoring terminal 7 is a PC (Personal Computer) and can communicate with the PLC 1 each other through the information network 6 using a communication protocol such as a TCP/IP (Transmission Control Protocol/Internet Protocol). A user can monitor data included in the user program and transmit a signal for performing control to the user program with the monitoring terminal 7. Note that the information network 6 connecting the monitoring terminal 7 and the PLC 1 is not limited to a local area network and can be a cloud such as the Internet.

An external system 8 is further connected to the information network 6. The external system 8 is, for example, a database. The external system 8 can communicate with the PLC 1 each other using a communication protocol such as the TCP/IP.

Figure 2:
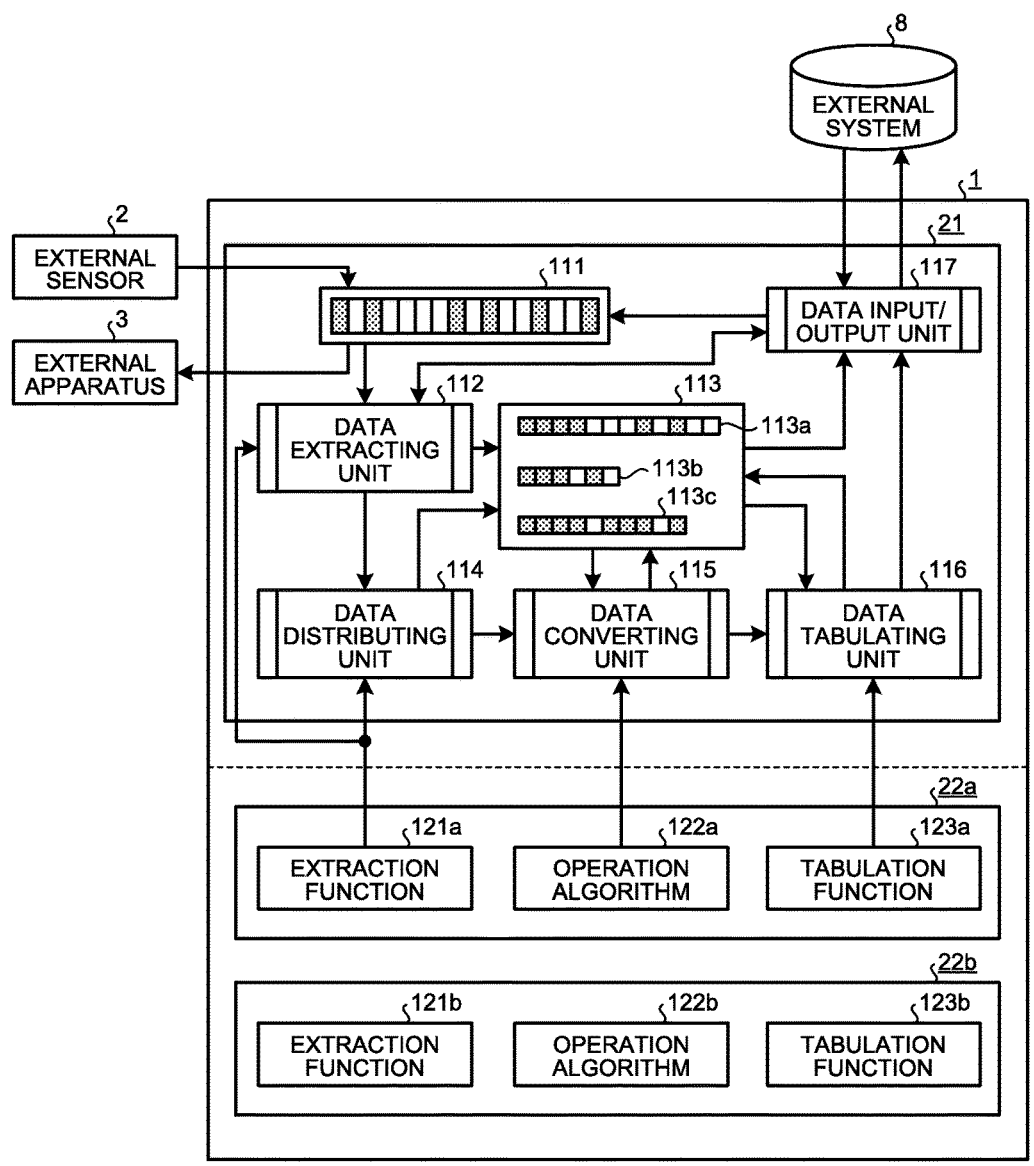
FIG. 2 is a schematic diagram showing a software configuration of a PLC in the first embodiment.

FIG. 2 is a schematic diagram showing a software configuration of the PLC in the first embodiment. The configuration of the PLC 1 in the first embodiment is explained with reference to FIG. 2.

The PLC 1 includes the host 21 and a plurality of plug-ins 22a and 22b. The host 21 is software implemented with common functions such as an operating system and a SCADA function. The plug-in 22a and the plug-in 22b are software for extending the functions.

Note that FIG. 2 illustrates that only the two plug-ins 22a and 22b are registered with respect to the host 21. However, actually, a plurality of plug-ins 22 are further registered in the host 21. In the following explanation, the plug-in 22a, the plug-in 22b, and the like are collectively referred to as plug-in 22. The plug-in 22a, the plug-in 22b, and the like shown in FIG. 2 corresponding to the plug-in 22 collectively illustrated in FIG. 1.

An extraction function 121a and an extraction function 121b, an operation algorithm 122a and an operation algorithm 122b, a tabulation function 123a and a tabulation function 123b, and the like of the plug-in 22 explained below are also collectively referred to as extraction function 121, operation algorithm 122, tabulation function 123, and the like.

The host 21 includes a device memory 111, a data extracting unit 112, an operation buffer 113, a data distributing unit 114, a data converting unit 115, a data tabulating unit 116, and a data input/output unit 117.

Note that, in FIG. 2, a plurality of operation buffers 113a, 113b, and 113c are illustrated. However, actually, as explained below, a plurality of operation buffers 113 are further generated. In the following explanation, the generated operation buffers 113a, 113b, 113c and the like are collectively referred to as operation buffer 113.

The device memory 111 stores and accumulates data acquired by the external sensor 2. The device memory 111 is managed by addresses. In general, input values input from the external sensor 2 are allocated to addresses having X as device names such as X000 to X9999 in the device memory 111. Output values output to the external apparatus 3 are allocated to addresses having Y as device names such as Y000 to Y9999 in the device memory 111. The other temporary data are allocated to regions called registers in the device memory 111. There are several types as the registers according to characteristics. To simplify an example, the registers are represented by addresses of D000 to D9999 having D (data) as device names.

The data extracting unit 112 extracts data that need to be collected among the data stored in the device memory 111. In extracting the data, the data extracting unit 112 acquires information such as types of data that need to be collected, collection periods of data, collection cycles of data, and collection conditions using the extraction function 121 of the plug-in 22.

The data extracting unit 112 generates a collection list, which is a list of the types of data that need to be collected, the collection periods of data, and the like. The collection list is a list of conditions concerning data extracted from the device memory 111. The data extracting unit 112 generates, according to the collection list, for each of the types of data that need to be collected, the collection periods of data, the collection cycles of data, and the collection conditions, the operation buffer 113 corresponding thereto.

Further, the data extracting unit 112 extracts, using the extraction function 121, data corresponding to types predetermined as the types of data that need to be collected among the data stored in the device memory 111.

A plurality of operation buffers 113 are generated by the data extracting unit 112 to correspond to each of the types of data, the collection periods of data, and the like designated by the extraction function 121. Note that, in FIG. 2, as an example, the generated operation buffers 113a, 113b, and 113c are illustrated. However, the number of the operation buffers 113 to be generated is not limited to the example shown in FIG. 2. As explained in detail below, the operation buffers 113 are generated by a number corresponding to the types of data that need to be collected, the collection periods of data, the collection cycles of data, and the collection conditions described in the extraction function 121 of the plug-in 22.

The data distributing unit 114 stores the data extracted by the data extracting unit 112 in the operation buffer 113 corresponding to the data among the operation buffers 113 provided according to the types of data, the collection periods of data, and the like.

When the operation buffer 113 stores data equivalent to a predetermined collection period of data, concerning the data stored in the operation buffer 113, the data converting unit 115 executes the operation algorithm 122 of the plug-in 22 explained below, performs conversion processing of the data, and writes back an operation result to the operation buffer 113.

When the operation buffer 113 stores the data equivalent to the predetermined collection period of data, concerning the operation result of the data converting unit 115 stored in the operation buffer 113, the data tabulating unit 116 performs a tabulation operation using the tabulation function 123 of the plug-in 22 explained below and writes back a result of the tabulation operation to the operation buffer 113.

Note that, in the following explanation, the conversion processing of the data by the data converting unit 115 and the tabulation operation by the data tabulating unit 116 are collectively referred to as operation, respective operations, or the like.

The data input/output unit 117 reads out the tabulation result of the data tabulating unit 116 stored in the operation buffer 113 and outputs the tabulation result to the external system 8 or the device memory 111. The data input/output unit 117 causes, on the basis of a search command received from the external system 8, the data extracting unit 112 to search for data stored in the device memory 111 and receives data extracted from the device memory 111 by the data extracting unit 112 and outputs the data to the external system 8.

The plug-in 22 includes the extraction function 121, the operation algorithm 122, and the tabulation function 123.

The extraction function 121 is a function that is used when the data extracting unit 112 generates the operation buffer 113 and when the data extracting unit 112 extracts data from the device memory 111 and in which an algorithm for narrowing down data that need to be extracted is described. In the extraction function 121, types of data that need to be collected, collection periods of data, collection cycles of data, collection conditions, and the like are described.

The operation algorithm 122 is a function that is used when the data converting unit 115 performs an arithmetic operation concerning a value stored in the operation buffer 113 and in which algorithms concerning arithmetic operations of normalization, a bias, a rate, and the like are described.

The tabulation function 123 is a function that is used when the data tabulating unit 116 tabulates a value of an operation result of the data converting unit 115 and in which algorithms concerning tabulation operations for calculating a maximum, a minimum, a total, and the like are described.

As the extraction function 121a and the extraction function 121b, the operation algorithm 122a and the operation algorithm 122b, and the tabulation function 123a and the tabulation function 123b, usually, functions different from each other are described.

The extraction function 121a, the operation algorithm 122a, and the tabulation function 123a of the plug-in 22a are associated by the extraction function 121a. The extraction function 121b, the operation algorithm 122b, and the tabulation function 123b of the plug-in 22b are associated by the extraction function 121b. The extraction functions 121, the operation algorithms 122, and the tabulation functions 123 are registered in the host 21 as the plug-ins 22 for each of the extraction functions 121 related to thereto.

FIG. 3 is a diagram showing an example of the host and the plug-in in the first embodiment. Note that a number at the left end of FIG. 3 indicates which row of a program a row is. However, the number is attached for convenience of explanation of the program and is unrelated to content of the program.

In the program shown in FIG. 3, a seventh row to a thirty-third row indicate the plug-in 22 and a thirty-fifth row to a fiftieth row indicate the host 21. In the program shown in FIG. 3, an eleventh row to a fifteenth row indicate the extraction function 121 of the plug-in 22, a sixteenth row to a twenty-second row indicate the operation algorithm 122 of the plug-in 22, and a twenty-third row to a thirty-first row indicate the tabulation function 123 of the plug-in 22.

Note that, in the specification and the like of this application, all programs are described in the C language (C++).

In the program shown in FIG. 3, as an example of the collection condition of the extraction function 121, a collection condition for collecting data divisible by 2 among the data extracted from the device memory 111 is described. The program shown in FIG. 3 indicates that the data extracting unit 112 of the host 21 invokes the extraction function 121 of the plug-in 22, the data converting unit 115 of the host 21 invokes the operation algorithm 122 of the plug-in 22, and the data tabulating unit 116 of the host 21 invokes the tabulation function 123 of the plug-in 22.

In this way, the host 21 and the plug-in 22 in the PLC 1 in the first embodiment are configured as software by, for example, the program shown in FIG. 3. The host 21 and the plug-in 22 of the PLC 1 are realized by the processor 12 of the PLC 1 executing, for example, the program shown in FIG. 3. Note that the host 21 and the plug-in 22 in the PLC 1 in the first embodiment are not limited to this and can be realized by hardware.

An application example of the information link system in the first embodiment and collection and a tabulation operation of data performed using the information link system are explained.

In recent years, an information link system in which a control device such as the PLC 1 and host information system software such as the MES or the ERP are linked has been put to practical use. In the information link system, the control device can compute data of an apparatus connected to the control device, cause an external database to accumulate the data, and transmit the data to HMI software to cause the HMI software to graphically display the data. Among control devices, there is a control device that includes a database on the inside and in which a control CPU that exclusively performs sequence control is provided separately from a dedicated CPU for external communication to make it possible to efficiently perform collection of data provided to the host information system software and a control device that converts collected data into the XML (Extensible Markup Language) or the HTML (Hyper Text Markup Language) according to a request and transmits the data to the host information system software.

In a monitoring control system that treats high-speed/large-capacity process data like a water treatment or chemical plant, usually, dedicated software called SCADA is executed by a dedicated apparatus. In the plant, apparatuses such as a sensor and an actuator are connected to a control device. The control device executes a sequence control algorithm and transmits control signals to the apparatuses. The SCADA can read measurement data of the apparatuses stored in a memory of the control device, monitor the plant on a real-time basis, and store data in time series. There is also a SCADA including an HMI. Collected data can be graphically displayed on the HMI.

In the information link system in the first embodiment, the external sensor 2, which is the temperature sensor, the flow meter, or the like acquires data such as temperature or a flow rate. The PLC 1 reads measurement data from the external sensor 2 using the user program and writes the measurement data in the device memory 111 as an input value. However, as explained above, the device memory 111 stores the input value in an address allocated in advance. Therefore, when the PLC 1 acquires a value of the external sensor 2 anew, an old value of the same external sensor 2 already stored in the device memory 111 is overwritten by the input value acquired by the PLC 1 anew and is lost. Therefore, the information link system in the first embodiment periodically reads out a value of the device memory 111 with the SCADA, attaches readout time (time stamp) to read-out data, and stores the data in the external system 8, which is the database in the SCADA software.

Note that it is unnecessary to read out all values from the device memory 111. Values of the addresses of the device memory 111 are not limited to be read out at the same cycle. The data extracting unit 112 only has to read out any data from the device memory 111 at any timing. For example, among the values stored in the device memory 111, the data extracting unit 112 can read out values of the temperature sensor at every 60 seconds and read out values of the flow meter at every one second because changes of the values of the flow meter are large.

On the other hand, in the information link system, when data collected in a large quantity from a factory or a plant are used, a so-called tabulation operation for collectively performing processing concerning a plurality of data arranged in time series is sometimes executed to calculate a maximum, a minimum, a total, and the like of the collected data. However, when the control device adopts a system for defining an action in units of a job, to execute the tabulation operation, the control device needs to describe actions having the same content by the number of data to be collected. Therefore, setting work takes time and the number of times of invocation of an operation algorithm is enormous. Therefore, a computation amount of the control device is enormous and the control device cannot perform the tabulation operation at high speed. To execute a complicated arithmetic operation, it is necessary to divide one arithmetic operation into a plurality of actions and individually define the actions. Therefore, the computation amount increases and processing speed further decreases. Therefore, to execute the tabulation operation in such a case, it is necessary to prepare, separately from the control device, an exclusive personal computer including a database for performing the tabulation operation.

Further, when the monitoring control system that executes the SCADA is used in an environment where reliability and high quality are requested like a plant, it is necessary to use an expensive dedicated machine like an FA personal computer having high environmental resistance and failure resistance. Therefore, cost increases.

Therefore, in the information link system in the first embodiment, before the PLC 1 outputs the data stored in the device memory 111 to the external system 8, the information link system makes it possible to cause the PLC 1 to execute the tabulation operation at high speed. Consequently, the information link system configurable without separately using a dedicated personal computer is provided.

The operation of the information link system in the first embodiment is explained. FIG. 4 is a flowchart showing an operation procedure of the PLC at the time when the information link system in the first embodiment starts and performs initialization. The operation during the initialization of the information link system in the first embodiment is explained with reference to FIG. 4.

Note that, in the following explanation, in particular, an example is explained in which a temperature sensor "a" is connected to an input/output unit of the PLC 1 as the external sensor 2 and data measured by the temperature sensor "a" is monitored.

During the initialization of the information link system, at step ST1 in FIG. 4, the PLC 1 loads the plug-in 22 registered in the host 21 and executes processing.

FIG. 5 is a diagram showing an example of a host and a plug-in at the time when measurement data of the temperature sensor is collected in the first embodiment, the example being different from the example shown in FIG. 3. Note that a number at the left end of FIG. 5 indicates which row of a program a row is. However, the number is attached for convenience of explanation of the program and is unrelated to content of the program.

In the program shown in FIG. 5, a first row to a tenth row indicate an extraction function 121a of a plug-in 22a and a twelfth row to a fifty-eighth row indicate the host 21. In the twelfth row to the fifty-eighth row, the twelfth row to the twenty-fifth row indicate the data distributing unit 114 and the twenty-seventh row to the fifty-eighth row indicate the data extracting unit 112.

In the example explained below, the extraction function 121a is defined as test_function_per_day shown in a fourth row of FIG. 5 assuming that a collection period of data is one minute. The extraction function 121a shown in FIG. 5 indicates that data is read out from an address X1234 of the device memory 111 at a 1000 ms cycle from 00:00:00, which is start time, until 00:00:59, which is end time, every day.

Note that, as the extraction function 121a shown in FIG. 5, a function for simply returning a value is described. However, the extraction function 121a is not limited to this. Because the extraction function 121 is realized as a function, a condition that a value of another signal is ON such as a condition that data is extracted only when a signal indicating "in operation" is ON can be added. That is, because the extraction function 121 is realized as a function, a complicated logic can be easily described.

At step ST2 in FIG. 4, the data extracting unit 112 acquires, using the extraction function 121 of the plug-in 22, information such as types of data that need to be collected, collection periods of data, collection cycles of data, and collection conditions.

FIG. 6 is a diagram showing an example of data extracted by the data extracting unit in the first embodiment. In the PLC 1, the data extracting unit 112 and the data distributing unit 114 collect data shown in FIG. 6 using the extraction function 121. Note that, FIG. 6 indicates that, for example, data, a signal ID of which is 001/KL002, that is, measurement data of the temperature sensor "a" is extracted from the address X1234 of the device memory 111 at a 1000 ms cycle according to the extraction function 121a shown in FIG. 5.

The types of data that need to be collected mean, among the data stored in the device memory 111, types of data designated to be collected by the extraction function 121 of the plug-in 22. For example, in the case of the extraction function 121a shown in FIG. 5, the types of data that need to be collected are measurement data of the temperature sensor "a" as shown in FIG. 6.

The collection period of data means a period in which the data that need to be collected are collected. For example, in the case of the extraction function 121a shown in FIG. 5, the collection period of data is, as shown in FIG. 6, from 00:00:00 on Apr. 29, 2014, which is start time, until 00:00:59 on Apr. 29, 2014, which is end time.

The collection cycle of data means a cycle at which the data extracting unit 112 extracts, from the device memory 111, the data that need to be collected. For example, in the case of the extraction function 121a shown in FIG. 5, the collection cycle of data is 1000 milliseconds as shown in FIG. 6.

Note that, although not shown in FIG. 5, in the extraction function 121, names, signal IDs, addresses of allocated devices, and the like of the data that need to be collected are also described. The data extracting unit 112 acquires, from the extraction function 121 of the plug-in 22 registered in the host 21, information such as the names, the signal IDs, the addresses of the allocated devices of the data that need to be collected, the collection cycle of data, and start time and end time of collection. The data extracting unit 112 acquires, concerning all the plug-ins 22, the information such as the names and the signal IDs of the data from the extraction function 121.

At step ST3 in FIG. 4, the data extracting unit 112 generates a collection list in which the types of data that need to be collected, the collection periods of data, and the like are collected as a list.

FIG. 7 is a diagram showing an example of the collection list in the first embodiment. The collection list is, as shown in FIG. 7, a list in which conditions concerning data extracted from the device memory 111 are collected as a list and is a list in which, besides data for collecting the same signal at the same cycle and timing, data, collection cycles of which are multiples, and the like are arranged. In FIG. 7, for example, data of No. 1 corresponds to the data, the signal ID of which is 001/KL002 in FIG. 6. Note that the collection list is not limited to the collection list shown in FIG. 7 and can be a list of any form as long as data can be efficiently collected.

At step ST4 in FIG. 4, the PLC 1 determines whether all the plug-ins 22 have been processed. When all the plug-ins 22 have been processed, the PLC 1 proceeds to step ST5. Otherwise, the PLC 1 returns to step ST1 and repeats the processing.

At step ST5, the data extracting unit 112 generates, according to the collection list, for each of the types of data that need to be collected, the collection periods of data, the collection cycles of data, and the collection conditions, the operation buffer 113 corresponding thereto.

The number of elements of the operation buffer 113 to be generated is determined by start time and end time designated by the extraction function 121 of the plug-in 22 and the collection cycle of data. In the example shown in FIG. 7, for example, in the data of No. 1, the start time is 00:00:00 on Apr. 29, 2014, the end time is 59 seconds after the start time, and the collection cycle of data is 1000 ms=one second. Therefore, the number of elements is ((59+1)−0)÷1 [second]=60.

FIG. 8 is a diagram showing an example of an operation buffer in the first embodiment. In the example shown in FIG. 8, an operation buffer 113A explained below is illustrated. In FIG. 8(a), a state is shown in which the operation buffer 113A generated by the data extracting unit 112 stores values passed from the data distributing unit 114. In FIG. 8(b), a state is shown in which the same operation buffer 113A stores values of an operation result of the data converting unit 115. In FIG. 8(c), a state is shown in which the same operation buffer 113A stores values of a result of the tabulation operation of the data tabulating unit 116.

In the example of No. 1 shown in FIG. 7, as shown in FIG. 8(a), the data extracting unit 112 generates the operation buffer 113A in which the number of elements is sixty.

As another example, for example, concerning any signal not shown in FIG. 7, when data in a period from Jan. 1, 2014 until Jan. 31, 2014 are collected at a cycle of one day, the data extracting unit 112 generates the operation buffer 113 that can store thirty-one day data.

That is, the operation buffer 113 is generated to be capable of exactly storing data equivalent to the collection period of data and the collection cycle of data. A plurality of the operation buffers 113 are generated to correspond to each of the types of data, the collection periods of data, and the like designated by the extraction function 121.

The operation during the initialization of the information link system in the first embodiment is as explained above.

Figure 9:
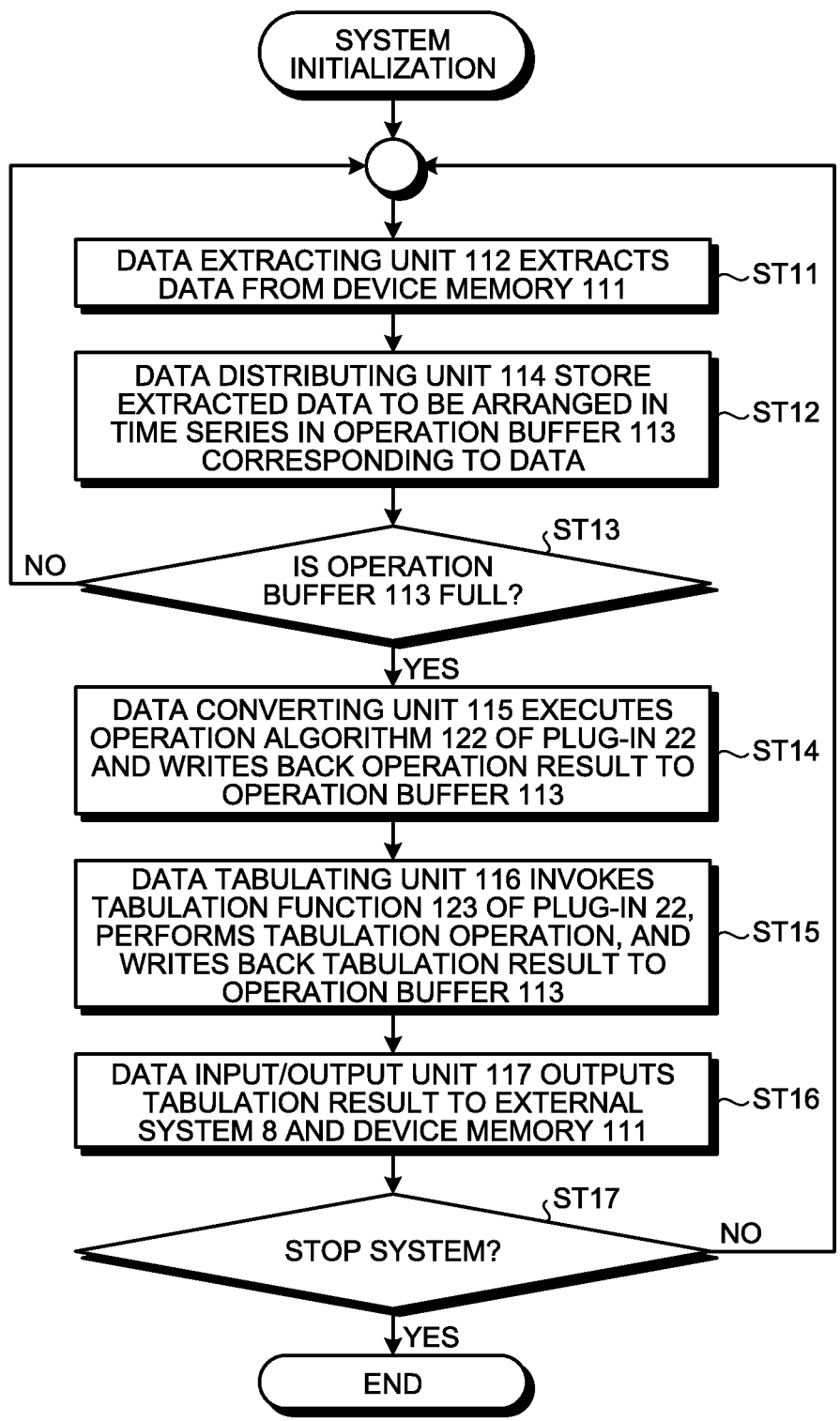
FIG. 9 is a flowchart showing a processing procedure of the PLC at the time when the information link system starts and begins operation in the first embodiment.
Figures 10, 11, 12:
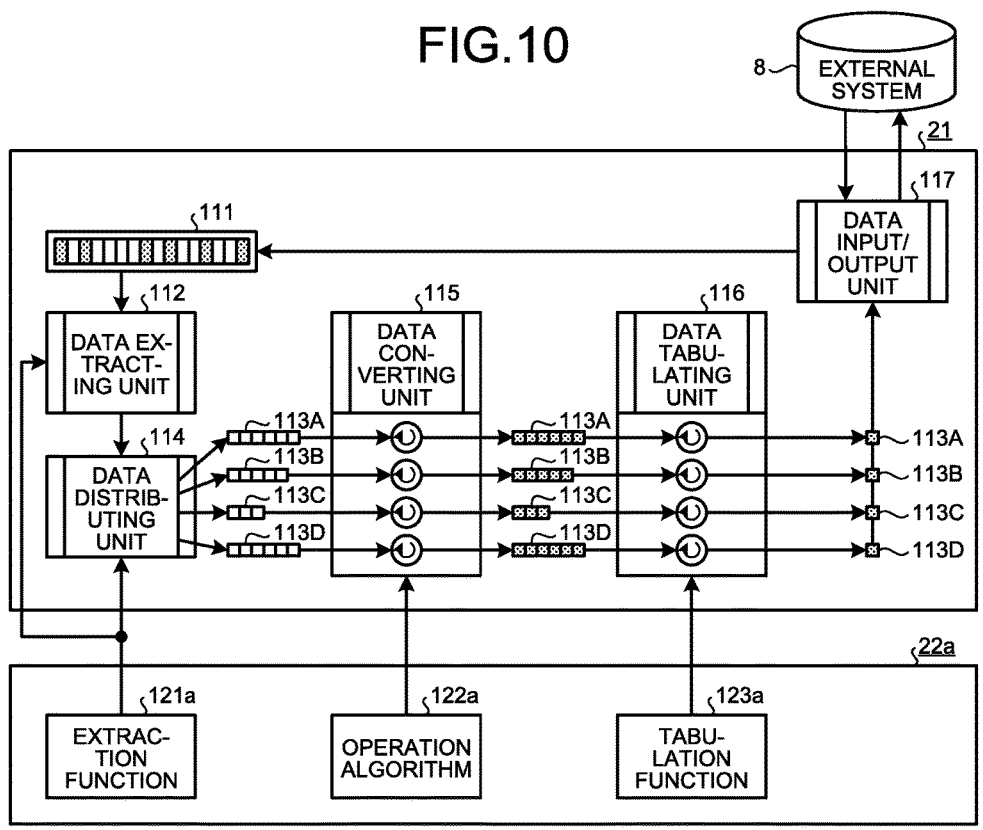
FIG. 10 is a schematic diagram showing operation after the start of the information link system in the first embodiment.
FIG. 11 is a diagram showing an example of a source code of a tabulation function for computing a maximum value in the first embodiment.
FIG. 12 is a diagram showing an example of a source code of a tabulation function for calculating a total in the first embodiment.

FIG. 9 is a flowchart showing a processing procedure of the PLC at the time when the information link system starts and begins operation in the first embodiment. FIG. 10 is a schematic diagram showing operation after the start of the information link system in the first embodiment. The operation of the started information link system in the first embodiment is explained with reference to FIGS. 9 and 10.

Note that, in FIG. 10, a plurality of operation buffers 113A, 113B, 113C, and 113D correspond to the operation buffer 113a, the operation buffer 113b, and the operation buffer 113c illustrated in FIG. 2, that is, represent an operation buffer same as the operation buffer 113 shown in FIG. 2. In FIG. 10, the operation buffer 113A, the operation buffer 113B, the operation buffer 113C, and the operation buffer 113D are respectively shown in plurality. However, the operation buffers are only described a plurality of times for convenience in illustrating the operation. The operation buffers 113 having the same reference signs in FIG. 10 represent the same operation buffer.

Further, in FIG. 10, only the plug-in 22a and the extraction function 121a, the operation algorithm 122a, and the tabulation function 123a incidental to the plug-in 22a are illustrated. However, as explained above, a plurality of plug-ins 22 are further registered in the host 21.

Note that, in an example explained below, it is assumed that the PLC 1 reads measurement data of the temperature sensor "a" as appropriate and writes the measurement data in the device memory 111 shown in FIG. 10.

When the information link system starts the operation, at step ST11 in FIG. 9, the data extracting unit 112 extracts, using the extraction function 121, data of types designated by the extraction function 121 from the device memory 111 at a cycle designated by the extraction function 121. When the address X1234 of the device memory 111 is designated as in an example shown in a first row to a tenth row of FIG. 5 in the extraction function 121a of the plug-in 22a shown in FIG. 10, the data extracting unit 112 periodically extracts the data, the signal ID of which is 001/KL002, shown in FIG. 6, that is, measurement data of the temperature sensor "a" from the address X1234 of the device memory 111. In this way, the data extracting unit 112 executes all the plug-ins 22 registered in the host 21 and periodically extracts data of types designated by the extraction functions 121 of the plug-ins 22.

When the same address is designated in different plug-ins 22, the data extracting unit 112 neglects the address as a redundant address. In FIG. 6, for example, a signal 001/KL006 is data of an address X2011 same as the address X2011 of a signal 001/KL003. A collection cycle of data is a double cycle of a collection cycle of the signal 001/KL003. Therefore, redundant data are used. Therefore, the data extracting unit 112 neglects one of the signal 001/KL006 and the signal 001/KL003 as redundant data. Consequently, it is possible to reduce the number of times the data extracting unit 112 extracts data from the device memory 111. It is possible to efficiently collect data.

As shown in FIG. 10, the data extracting unit 112 passes the extracted data to the data distributing unit 114.

At step ST12 in FIG. 9, as shown in FIG. 10, the data distributing unit 114 stores the data received from the data extracting unit 112 in the operation buffer 113 corresponding to types of data, collection periods of data, collection cycles of data, and collection conditions.

As a method of specifying the operation buffer 113, for example, a method of creating a table in which conditions of data to be collected are shored shown in FIG. 6, calculating hashes from element values of the table, and associating values of the hashes with the operation buffer 113 is conceivable. However, the method of specifying the operation buffer 113 is not limited to this and can be other methods as long as the operation buffer 113 and the conditions of the data to be collected are efficiently associated.

At step ST12 in FIG. 9, the data distributing unit 114 stores the data extracted by the data extracting unit 112 in the operation buffer 113 corresponding to the data on the basis of the types of data that need to be collected, the collection periods of data, the collection cycles of data, and the collection conditions. For example, data distributing unit 114 stores, on the basis of an address, a cycle, and start time of the device memory 111 acquired from an extraction function 112a of the plug-in 22a, the measurement data of the temperature sensor "a" extracted by the data extracting unit 112 in the operation buffer 113A corresponding to the measurement data to be arranged in time series. The operation buffer 113A stores values passed from the data distributing unit 114 as, for example, {X|100, 200, 300, 400, . . . , 6000} at every 1000 millisecond as shown in FIG. 8(a).

Note that the collection condition means a condition used for determining whether collection is necessary concerning data extracted from the device memory 111 by the data extracting unit 112 using the extraction function 121. The collection condition is that, for example, when data extracted from the device memory 111 is measurement data of a temperature sensor "b", if the extracted measurement data indicates 40° C. or more, the measurement data is stored in the operation buffer 113 corresponding to the measurement data. Therefore, for example, in the extraction function 121b, as the types of data that need to be collected, the collection cycles of data, and the collection conditions, when it is designated to collect measurement data of the temperature sensor "b" equal to or higher than 40° C. at a 60 second cycle and the measurement data of the temperature sensor "b" are stored in the device memory 111 in the order of {10° C., 20° C., 40° C., 50° C., 10° C., 0° C., 10° C., . . . }, the data distributing unit 114 stores, among the measurement data of the temperature sensor "b" read out at every 60 seconds from the device memory 111 by the data extracting unit 112, two values of 40° C. and 50° C. in the operation buffer 113B corresponding to the values.

When data, any one of collection periods of data, collection cycles of data, and collection conditions, which are conditions of the data to be collected, of which are different, are collected, the data distributing unit 114 stores, in separate operation buffers 113, data of the same type extracted by the data extracting unit 112 from the same address of the device memory 111. For example, it is assumed that there is a plug-in 22c for collecting sixty measurement data of the temperature sensor "a" in total at every one minute from 00:00:00 to 00:59:00 every day. That is, like the plug-in 22a shown in FIG. 5 and FIG. 10, the plug-in 22c collects the measurement data of the temperature sensor "a". However, the plug-in 22c collects the measurement data at a collection cycle of data different from the collection cycle of the plug-in 22a for a collection period of data different from the collection period of the plug-in 22a. In this case, as explained above, at step ST5 in FIG. 4, for example, the operation buffer 113C shown in FIG. 10 is further separately generated as the operation buffer 113 corresponding to the measurement data different from the operation buffer 113A. Therefore, when the plug-in 22c is executed, at step ST12 in FIG. 9, the data distributing unit 114 stores data same as the measurement data of the temperature sensor "a" collected by the plug-in 22a in the operation buffer 113C corresponding to the measurement data different from the operation buffer 113A. Therefore, when the data of the same type, any one of collection periods of data, collection cycles of data, and collection conditions of which are different, are collected, as shown in FIG. 10, the PLC 1 in the first embodiment can execute arithmetic operations for each of the different collection periods of data, the different collection cycles of data, and the different collection conditions in parallel.

As explained above, the operation buffers 113 are generated according to the collection periods of data and the collection cycles of data. Therefore, data storable capacities of the operation buffers 113 are determined. Therefore, at step ST13 in FIG. 9, when data are written in all the elements of the operation buffer 113, that is, when the operation buffer 113 accumulates data to the full capacity of the operation buffer 113, as shown in FIG. 10, the data distributing unit 114 completes the writing of the data in the operation buffer 113 and notifies the data converting unit 115 to that effect.

At step ST14 in FIG. 9, the data converting unit 115 executes the operation algorithm 122 of the plug-in 22. The data converting unit 115 receives, as an input, a value stored in the operation buffer 113, the full capacity of which is filled, and performs an arithmetic operation of the operation algorithm 122.

As an example of the arithmetic operation of the operation algorithm 122 by the data converting unit 115, the operation algorithm 122a for performing normalization is explained. In general, an analog input value of a sensor or the like changes to a digital value when being written in the PLC 1. For example, when there is the temperature sensor "a" that can measure temperature of 10° C. to 70° C. and resolution is 0 to 40000, values of 0 to 40000 are written in the device memory 111. In this case, the value of 0 stored in the device memory 111 indicates 10° C. and the value of 40000 stored in the device memory 111 indicates 70° C.

The data converting unit 115 executes the operation algorithm 122a shown in FIG. 10 and computes temperature from the value stored in the operation buffer 113A. In the case of the example explained above, when the input value from the temperature sensor "a" is represented as X[i], the data converting unit 115 calculates temperature T according to the following Expression (1).

[Math. 1]

$$T=(X[i]-0)/40000\times(70[°\,C.]-10[°\,C.])+10[°\,C.] \quad (1)$$

For example, when the value stored in the operation buffer 113A is 24000, the data converting unit 115 calculates the temperature T as (24000−0)/40000×60+10=46° C. according to the above Expression (1). The data converting unit 115 performs the arithmetic operation of the above Expression (1) concerning the value stored in the operation buffer 113A shown in FIG. 8(a) and calculates temperature corresponding to the value as {Temp|10.15, 10.30, 10.45, 11.00, . . . , 19.00} as shown in FIG. 8(b).

In this way, at timing when the operation buffers 113 are filled, the data converting unit 115 executes the operation algorithm 122 corresponding to the operation buffers 113. Note that the data converting unit 115 can execute the operation algorithms 122 concerning arithmetic operations of not only the normalization explained above but also a bias, a rate, and the like.

At step ST14 in FIG. 9, as shown in FIG. 10, the data converting unit 115 writes back an operation result to the same operation buffer 113. After an operation end, for example, when the operation algorithm 122a finishes calculating all of the values shown in FIG. 8(b) in the case of the above Expression (1), the data converting unit 115 notifies the data tabulating unit 116 to that effect.

At step ST15 in FIG. 9, the data tabulating unit 116 tabulates a value of the operation result of the data converting unit 115 stored in the operation buffer 113. As shown in FIG. 10, the data tabulating unit 116 executes tabulation operations of a maximum, a minimum, a total, and the like using the tabulation function 123 of the plug-in 22.

FIG. 11 is a diagram showing an example of a source code of a tabulation function for computing a function max for calculating a maximum value. FIG. 12 is a diagram showing an example of a source code of a tabulation function for computing a function sum for calculating a total. Note that a number at the left end in FIG. 11 and FIG. 12 indicates which row of a program a row is. However, the number is attached for convenience of explanation of the program and is unrelated to content of the program.

The tabulation function 123a shown in FIG. 10 is, for example, a program shown in FIG. 11 or FIG. 12. In FIG. 11 and FIG. 12, the value shown in FIG. 8(b) is passed to value_array described in the first row of the tabulation function 123a. 60, which is the number of elements of the operation buffer 113A shown in FIG. 8(a) or FIG. 8(b), is passed to length described in the first row. The data tabulating unit 116 executes, using the tabulation function 123a shown in FIG. 11 and FIG. 12, a tabulation operation concerning the operation result of the operation algorithm 122a stored in the operation buffer 113A.

The data tabulating unit 116 overwrites, on the same operation buffer 113, a tabulation value of a result obtained by executing the tabulation operation by the tabulation function 123. For example, as shown in FIG. 8(c), the data tabulating unit 116 overwrites, on the same operation buffer 113A, a tabulation value of a result obtained by executing the tabulation operation by the tabulation function 123a concerning the operation result of the operation algorithm 122a stored in the operation buffer 113A. In the example shown in FIG. 8(c), in the operation buffer 113A, a maximum is written in the zero-th element, a minimum is written in the first element, and an average, a total, and the like are subsequently written.

Note that, as in the Patent Literature 1 described above, it is designated using a definition file or the like in advance in which element of the operation buffer 113 which tabulation value is written. The tabulation function 123 often in use can be implemented on the host 21 side rather than in the plug-in 22. Further, because the tabulation function 123 is also the plug-in 22, types of the tabulation operation are not limited to the maximum, the minimum, and the total. Tabulation operations other than these can be performed.

At step ST16 in FIG. 9, as shown in FIG. 10, the data input/output unit 117 reads out a tabulation value from the operation buffer 113, writes back the read-out tabulation value to the device memory 111, and outputs the tabulation value to the external system 8 using a communication protocol such as the TCP/IP. For example, the data input/output unit 117 outputs a total of 843.60 in the tabulation result shown in FIG. 8(c) to the external system 8.

Note that, as in Patent Literature 1 described above, it is described in the definition file in advance which tabulation value in the tabulation result is transmitted or written back.

When a command for stopping the system is not detected at step ST16 in FIG. 9, the PLC 1 returns to step ST11 and repeats the processing. When the command for stopping the system is detected, the PLC 1 stops the processing.

As explained above, the PLC 1 in the first embodiment extracts data from the device memory 111 in advance before executing the arithmetic operations such as the arithmetic operation by the operation algorithm 122 and the tabulation operation by the tabulation function 123 and executes the arithmetic operations after distributing the extracted data to the operation buffers 113 corresponding to the data in advance. Therefore, the PLC 1 in the first embodiment can execute the arithmetic operations in parallel for each of the operation buffers 113. It is possible to perform high-speed processing.

The PLC 1 in the first embodiment executes, on condition that the operation buffer 113 is filled, the arithmetic operations concerning the value stored in the operation buffer 113. Therefore, the PLC 1 can perform the arithmetic operations independently for each of the operation buffers 113. Therefore, the PLC 1 in the first embodiment can asynchronously execute the arithmetic operations without requiring synchronization for, for example, waiting for an end of a certain arithmetic operation. It is possible to perform high-speed processing.

In the first embodiment, the data extracting unit 112 generates, for each of the types of data, the collection periods of data, the collection cycles of data, and the collection conditions, the operation buffer 113 corresponding thereto. The data distributing unit 114 stores the data extracted by the data extracting unit 112 in the different operation buffers 113 when any one of collection periods of data, collection cycles of data, and collection conditions are different even if types of data are the same. Therefore, the PLC 1 in the first embodiment is capable of executing, concerning the collected data, the arithmetic operations in parallel for each of the different operation buffers 113 not only when the types of data are different but also when the arithmetic operations are preformed concerning the data, any one of the collection periods of data, the collection cycles of data, and the collection conditions of which are different. Further, the PLC 1 can perform the arithmetic operations independently for each of the operation buffers 113. Therefore, it is possible to asynchronously execute the arithmetic operations. It is possible to perform the arithmetic processing at high speed.

Further, the data used for the arithmetic operation is stored in the operation buffer 113 in advance before the arithmetic operation. Therefore, the PLC 1 in the first embodiment does not need to perform a search from a temporarily stored data region such as a database provided on the outside of the PLC 1 as the external system 8. Time required for the search of the data cannot be neglected more as an amount of the data to be treated is larger. However, the PLC 1 in the first embodiment stores the data respectively in the separate operation buffers 113 for each of the types of data, the collection periods of data, and the like. Therefore, the search for the data is unnecessary. It is possible to omit the search time. It is possible to perform high-speed processing.

In addition, the extraction function 121, the operation algorithm 122, and the tabulation function 123 are associated for each of the extraction functions 121. The extraction function 121, the operation algorithm 122, and the tabulation function 123 are registered in the host 21 as the plug-in 22 for each of the extraction functions 121 related thereto. Therefore, when it is desired to use a new extraction function 121, a new operation algorithm 122, and a new tabulation function 123, that is, when it is desired to collect data according to new conditions, the PLC 1 in the first embodiment only has to add a new plug-in 22 to the host 21. It is possible to more flexibly configure the PLC 1 that can asynchronously execute the arithmetic operations in parallel and perform the arithmetic operations at high speed.

Note that, as explained above, it is also possible to prepare, separately from the PLC 1, a dedicated personal computer including a database for performing the tabulation operation and cause the personal computer to execute the tabulation operation. However, in this case, it is necessary to separately prepare an expensive dedicated machine. On the other hand, the information link system in the first embodiment can cause the PLC 1 to execute the tabulation operation. Therefore, it is possible to configure the system without separately using the dedicated personal computer.

Note that, in the first embodiment, when the operation buffer 113 accumulates the data to the full capacity of the operation buffer 113, the writing of the data is completed. The arithmetic operation is performed on the basis of the value stored in the operation buffer 113. However, the present invention is not limited to this.

As explained above, the operation buffer 113 is generated to be capable of exactly storing the data equivalent to the collection period of data and the collection cycle of data. As explained above, the operation buffer 113 is generated for each of the collection conditions by the data extracting unit 112. Therefore, concerning data extracted from the device memory 111, even if there is the operation buffer 113 corresponding to the types of data, the collection periods of data, and the collection cycles of data, the data distributing unit 114 does not store the data in the operation buffer 113 when the data does not satisfy the collection condition. Therefore, when there is data not satisfying the collection condition, the data is not stored in the operation buffer 113 corresponding to the data. Therefore, the operation buffer 113 is not filled even if the collection period of data elapses. Therefore, in addition to completing the writing of the data and performing the arithmetic operation concerning the value stored in the operation buffer 113 when the operation buffer 113 accumulates the data to the full capacity of the operation buffer 113, the arithmetic operation can be executed concerning the value stored in the operation buffer 113 on condition that the collection period of data elapses.

Besides, for example, when generating the operation buffers 113, the data extracting unit 112 can generate the operation buffer 113 having an additional capacity in addition to the capacity corresponding to the collection period of data and the collection cycle of data. When the operation buffer 113 stores data by an amount corresponding to the collection period of data and the collection cycle of data, that is, when the remaining capacity of the operation buffer 113 is only the additional capacity, the data extracting unit 112 detects this, completes the writing of the data, and performs the arithmetic operation concerning the value stored in the operation buffer 113. In these cases, it is also possible to execute the arithmetic operations in parallel for each of the operation buffers 113. Further, because synchronization for, for example, waiting for an end of a certain arithmetic operation is unnecessary, it is possible to asynchronously execute the arithmetic operations. It is possible to perform high-speed processing.

In the first embodiment, the data extracting unit 112 generates, for each of the types of data that need to be collected, the collection periods of data, the collection cycles of data, and the collection conditions, the operation buffer 113 corresponding thereto. The data distributing unit 114 stores, on the basis of the types of data that need to be collected, the collection periods of data, the collection cycles of data, and the collection conditions, the data extracted from the device memory 111 by the data extracting unit 112 in the operation buffer 113 corresponding to the data. However, the present invention is not limited to this.

For example, the data extracting unit 112 can generate, for each of the types of data that need to be collected, the collection periods of data, the collection cycles of data, and the extraction conditions, the operation buffer 113 corresponding thereto. The data distributing unit 114 can store, on the basis of the types of data that need to be collected, the collection periods of data, the collection cycles of data, and the extraction conditions, the data extracted from the device memory 111 by the data extracting unit 112 in the operation buffer 113 corresponding to the data. The extraction condition is a condition that, when the data extracting unit 112 extracts data from the device memory 111 with the extraction function 121, the data to be extracted should satisfy. In this case, the data extracting unit 112 extracts only data satisfying the extraction condition designated by the extraction function 121 among the data stored in the device memory 111. The data distributing unit 114 stores the data passed from the data extracting unit 112 in the operation buffer 113 corresponding to the data. In such a case, it is also possible to execute the arithmetic operations in parallel for each of the operation buffers 113. Because synchronization for, for example, waiting for an end of a certain arithmetic operation is unnecessary, it is possible to asynchronously execute the arithmetic operations. It is possible to perform high-speed processing.

REFERENCE SIGNS LIST

1 PLC
2 external sensor
3 external apparatus
4 maintenance terminal
5 control network
6 information network
7 monitoring terminal
8 external system
11 memory
12 processor
21 host
111 device memory
112 data extracting unit
113 operation buffer
114 data distributing unit
115 data converting unit
116 data tabulating unit
117 data input/output unit
22 plug-in
121 extraction function
122 operation algorithm
123 tabulation function

The invention claimed is:

1. A control device comprising:
a memory to store data acquired from an external apparatus; and
a processor programmed to:
extract data stored in the memory;
store the extracted data in a buffer corresponding to the data among a plurality of buffers provided according to the data to be stored; and
perform arithmetic processing of data stored in different buffers among the plurality of buffers,
wherein the plurality of buffers are provided according to each of the predetermined types, and the processor extracts the data according to each of the predetermined types and performs the arithmetic processing corresponding to each of the predetermined types by using the data stored in the corresponding buffers among the plurality of buffers provided according to each of the predetermined types, and
wherein the buffers are provided to correspond to each of the predetermined types and collection cycles of data, the processor is further programmed to:
extract the data of the predetermined types at a first cycle and extract the data at a second cycle different front the first cycle concerning the collection cycles of data, and
store, on the basis of the predetermined types and the first cycle, the data extracted at the first cycle in a buffer corresponding to the data among the buffers and store, on the basis of the predetermined types and the second cycle, the data extracted at the second cycle in a buffer corresponding to the data different from the buffer in which the data extracted at the first cycle is stored among the buffers.

2. The control device according to claim 1, wherein the processor is further programed to execute the arithmetic processing when data equivalent to a predetermined period is stored.

3. The control device according to claim 2, wherein the processor is further programed to:
perform, concerning the data equivalent to the predetermined period stored in the buffer, conversion processing of the data on the basis of predetermined operation algorithms, and
perform the arithmetic processing on the basis of a result of the conversion processing.

4. The control device according to claim 3, wherein
extraction functions for extracting the data of the predetermined types, the operation algorithms, and tabulation functions used for the arithmetic processing by the data tabulating unit are associated for each of the extraction functions, and
the extraction functions, the operation algorithms, and the tabulation functions are registered as plug-ins for each of the extraction functions related.

5. The control device according to claim 1, wherein
the buffers are provided to correspond to each of the predetermined types and collection periods of data, and
the processor is further programed to store the extracted data in the buffer corresponding to the data among the buffers on the basis of the predetermined types and the collection periods of data.

6. The control device according to claim 1, wherein
the buffers are provided to correspond to each of predetermined types and conditions for collecting data, and
the processor is further programed to:
store data satisfying a first condition concerning the collecting conditions among the extracted data of the predetermined types in a buffer corresponding to the data among the buffers and store data satisfying a second condition different from the first condition concerning the collecting condition among the extracted data of the predetermined types in a buffer corresponding to the data different from the buffer in which the data satisfying the first condition is stored among the buffers.

7. The control device according to claim 1, wherein the processor is further programed to output an operation result of the arithmetic processing to the memory or an external database.

8. The control device according to claim 1, wherein the external apparatus is controlled by a control signal output from the control device.

9. The control device according to claim 1, wherein:
the data acquired from an external apparatus is measurement data output by an external sensor,
the control device is a programmable logic controller (PLC) which exchanges the data with at least one other PLC in real time.

10. The control device according to claim 1, wherein the processor is programmed to execute a host comprising common functions and a plurality of plug-ins for extending the common functionality of the host and wherein each of the plurality of plug-ins comprise instructions for extracting the data, for performing the arithmetic processing of the data, and for performing tabulation processing of the data.

11. The control device according to claim 1, wherein the processor is programmed to generate a collection list for extracting of the data, which is a list of the types of measurement data to be collected, collection periods of the data, collection cycles of the data, and collection conditions of the data.

12. The control device according to claim 1, wherein the arithmetic processing is on a value of the data stored in a respective buffer and comprises at least one of a normalization operation, a bias, a rate operation, and wherein the processor is further programmed to perform a tabulation processing based on a result of the arithmetic processing.

13. The control device according to claim 1, wherein the data acquired from the external apparatus comprises measurement data measured by an external device controlled by the processor and wherein the types of data comprises different types of measurement values output by different types of measurement devices.

14. A control method comprising:
storing, in a memory, data acquired from an external apparatus;
extracting data stored in the memory;
storing the extracted data in a buffer corresponding to the data among a plurality of buffers provided according to the data to be stored; and
performing arithmetic processing of data stored in different buffers among the plurality of buffers,
wherein the plurality of buffers are provided according to each of the predetermined types, the data according to each of the predetermined types are extracted in the data extracting step, and the arithmetic processing corresponding to each of the predetermined types is performed by using the data stored in the corresponding buffers among the plurality of buffers provided according to each of the predetermined types in the arithmetic processing step, and
further comprising generating, for each of the predetermined types and conditions for collecting data, a buffer corresponding thereto, wherein
storing the extracted data includes storing data satisfying a first condition concerning the collecting conditions among the extracted data of the predetermined types in a buffer corresponding to the data among the generated buffers and storing data satisfying a second condition different from the first condition concerning the collecting condition among the extracted data of the predetermined types in a buffer corresponding to the data different from the buffer in which the data satisfying the first condition is stored among the buffers.

15. The control method according to claim 14, wherein performing arithmetic processing is executed when data equivalent to a predetermined period is stored.

16. The control method according to claim 15, further comprising performing, concerning the data equivalent to the predetermined period stored in the buffer, conversion processing of the data on the basis of predetermined operation algorithms, wherein
the arithmetic processing is performed on the basis of a result of the conversion processing by the data converting step.

17. The control method according to claim 16, wherein extraction functions for extracting the data of the predetermined types, the operation algorithms, and tabulation functions used for the arithmetic processing by the data tabulating step are associated for each of the extraction functions, and
the extraction functions, the operation algorithms, and the tabulation functions are registered as plug-ins for each of the extraction functions related thereto.

18. The control method according to claim 17, further comprising outputting an operation result of the arithmetic processing to the memory or an external database.

19. The control method according to claim 14, further comprising generating, for each of the predetermined types and collection periods of data, a buffer corresponding thereto, wherein
storing the extracted data includes, on the basis of the predetermined types and the collection periods of data, storing the extracted data in the buffer corresponding to the data among the generated buffers.

20. The control method according to claim 14, further comprising generating, for each of the predetermined types and collection periods of data, a buffer corresponding thereto, wherein
extracting the stored data includes extracting the data of the predetermined types at a first cycle and a second cycle different from the first cycle concerning the collection cycles of data, and
storing the extracted data includes, on the basis of the predetermined types and the first cycle, storing the data extracted at the first cycle in a buffer corresponding to the data among the generated buffers and, on the basis of the predetermined types and the second cycle, storing the data extracted at the second cycle in a buffer corresponding to the data different from the buffer in which the data extracted at the first cycle is stored among the buffers.

21. The control method according to claim 14, wherein a control of the external apparatus is performed by a control signal output from a control device.

22. A program installed in a memory in a control device including the memory to store the program and a processor to execute the program, the control device performing arithmetic processing for each of data equivalent to a predetermined period among data acquired from an external apparatus, the program causing the processor of the control device to execute:
extracting data acquired from the external apparatus and stored in the memory;
storing the extracted data in a buffer corresponding to the data among a plurality of buffers provided according to the data to be stored; and
performing arithmetic processing of data stored in different buffers among the plurality of buffers, wherein the plurality of buffers are provided according to each of the predetermined types, the data according to each of the predetermined types are extracted in the data extracting step, and the arithmetic processing corresponding to each of the predetermined types is performed by using the data stored in the corresponding buffers among the plurality of buffers provided according to each of the predetermined types in the arithmetic processing step, and wherein, for each of predetermined types and collection periods of data, a buffer corresponding thereto is generated, wherein extracting the stored data includes extracting the data of the predetermined types at a first cycle and a second cycle different from the first cycle concerning the collection cycles of data, and storing the extracted data includes, on the basis of the predetermined types and the first cycle, storing the data extracted at the first cycle in a buffer corresponding to the data among the generated buffers and, on the basis of the predetermined types and the second cycle, storing the data extracted at the second cycle in a buffer corresponding to the data different from the buffer in which the data extracted at the first cycle is stored among the buffers.

23. The program according to claim 22, wherein the program causes the processor to further execute the arithmetic processing when data equivalent to a predetermined period is stored.

24. The program according to claim 22, wherein, for each of predetermined types and collection periods of data, a buffer corresponding thereto is generated, wherein, storing the extracted data includes, on the basis of the predetermined types and the collection periods of data, storing the extracted data in the buffer corresponding to the data among the generated buffers.

25. The program according to claim 22, wherein, for each of predetermined types and conditions for collecting data, a buffer corresponding thereto is generated, wherein, storing the extracted data includes storing data satisfying a first condition concerning the collecting conditions among the extracted data of the predetermined types in a buffer corresponding to the data among the generated buffers and storing data satisfying a second condition different from the first condition concerning the collecting condition among the extracted data of the predetermined types in a buffer corresponding to the data different from the buffer in which the data satisfying the first condition is stored among the buffers.

26. The program according to claim 22, wherein, concerning the data equivalent to the predetermined period stored in the buffer, conversion processing of the data on the basis of predetermined operation algorithms is performed, wherein the arithmetic processing is performed on the basis of a result of the conversion processing by the data converting step.

27. The program according to claim 26, wherein storing the extracted data further includes generating buffers corresponding to predetermined types, extraction functions for extracting the data of the predetermined types, the operation algorithms, and tabulation functions used for the arithmetic processing are associated for each of the extraction functions, and the extraction functions, the operation algorithms, and the tabulation functions are registered as plug-ins for each of the extraction functions related.

28. The control program according to claim 22, wherein the control device outputs a control signal to control the external apparatus.

29. A control device comprising:
a memory to store data acquired from an external apparatus; and
a processor programmed to:

extract data of a memory region set as an extraction target among the data stored in the memory;
store the extracted data in a buffer set as a storage destination; and
perform arithmetic processing of the extracted data stored in the buffer,
wherein the buffers are provided according to each of the predetermined types, and the processor extracts the data according to each of the predetermined types and performs the arithmetic processing corresponding to each of the predetermined types by using the data stored in the corresponding buffers among the plurality of buffers provided according to each of the predetermined types, and
wherein the processor is further programmed to extract the data of the predetermined types at a first cycle from among a plurality of collection cycles of data and extract the data at a second cycle different from the first cycle from among the plurality of collection cycles of data, and
store, based on the predetermined types and the first cycle, the data extracted at the first cycle in a first buffer corresponding to the data among the buffers and store, based on the predetermined types and the second cycle, the data extracted at the second cycle in a second buffer corresponding to the data different from the first buffer in which the data extracted at the first cycle is stored among the buffers.

30. The control device according to claim 29, wherein the processor is further programmed to execute the arithmetic processing when data equivalent to a predetermined period is stored.

31. The control device according to claim 29, wherein the processor is further programmed to output an operation result of the arithmetic processing to the memory or an external database.

32. The control device according to claim 29, wherein the external apparatus is controlled by a control signal output from the control device.

33. A control method comprising:
storing, in a memory, data acquired from an external apparatus;
extracting data stored in the memory, the data of a memory region set as an extraction target among the data stored in the memory;
storing the extracted data in a buffer set as a storage destination; and
performing arithmetic processing of the extracted data stored in the buffer, wherein the buffers are provided according to each of the predetermined types, the data according to each of the predetermined types are extracted in the data extracting step, and the arithmetic processing corresponding to each of the predetermined types is performed by using the data stored in the corresponding buffers among the plurality of buffers provided according to each of the predetermined types in the arithmetic processing step,
wherein the buffers are provided to correspond to each of predetermined types and collecting conditions for collecting data, and
wherein the storing the extracted data comprises storing data satisfying a first condition concerning the collecting conditions among the extracted data of the predetermined types in a first buffer corresponding to the data among the buffers and storing data satisfying a second condition different from the first condition concerning the collectin conditions among the extracted data of the predetermined types in a second buffer corresponding to the data different from the first buffer in which the data satisfying the first condition is stored among the buffers.

34. The control method according to claim 33, wherein performing arithmetic processing is executed when data equivalent to a predetermined period is stored.

35. The control method according to claim 33, further comprising outputting an operation result of the arithmetic processing to the memory or an external database.

36. The control method according to claim 33, wherein a control of the external apparatus is performed by a control signal output from a control device.

37. A program for causing, in a control device including a memory to store a program and a processor to execute the program, the processor to execute:
   storing, in the memory, data acquired from an external apparatus;
   extracting data stored in the memory, the data of a memory region set as an extraction target among the data stored in the memory, and storing the extracted data in a buffer set as a storage destination; and
   performing arithmetic processing of the extracted data stored in the buffer, wherein the buffers are provided according to each of the predetermined types, the data according to each of the predetermined types are extracted in the data extracting step, and the arithmetic processing corresponding to each of the predetermined types is performed by using the data stored in the corresponding buffers among the plurality of buffers provided according to each of the predetermined types in the arithmetic processing step,
   wherein the program causes the processor to further execute extraction processing of the data of the predetermined types at a first cycle and the extraction processing of the data at a second cycle different from the first cycle concerning collection cycles of data, and
   storing processing, based on the predetermined types and the first cycle, the data extracted at the first cycle in a first buffer corresponding to the data among the buffers and the storing processing, based on the predetermined types and the second cycle, the data extracted at the second cycle in a second buffer corresponding to the data different from the first buffer in which the data extracted at the first cycle is stored anion the buffers.

38. The program according to claim 37, wherein the program causes the processor to further execute the arithmetic processing when data equivalent to a predetermined period is stored.

39. The control program according to claim 37, wherein the control device outputs a control signal to control the external apparatus.

* * * * *